H. M. VIZCARRA.
EDUCATIONAL APPARATUS.
APPLICATION FILED AUG. 8, 1917.
1,286,157.
Patented Nov. 26, 1918.
2 SHEETS—SHEET 1.
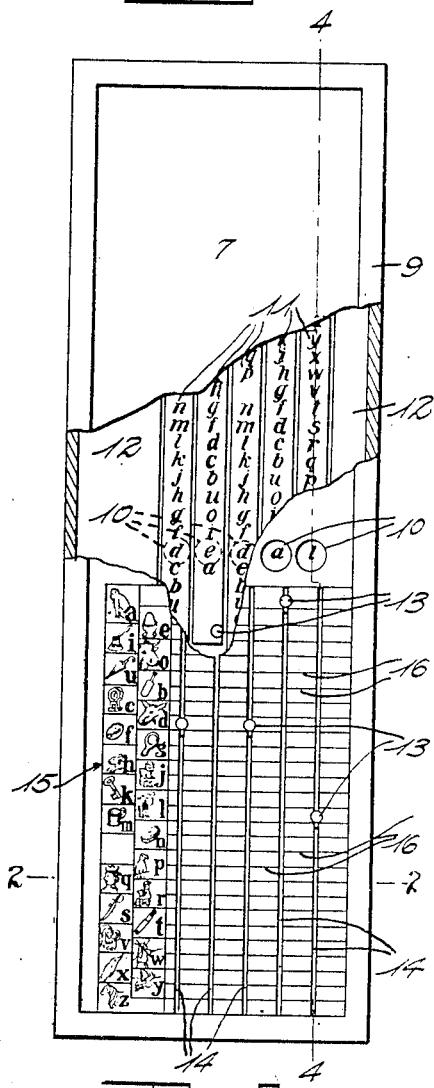
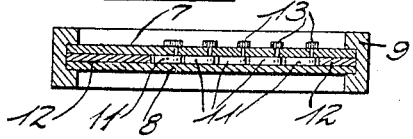
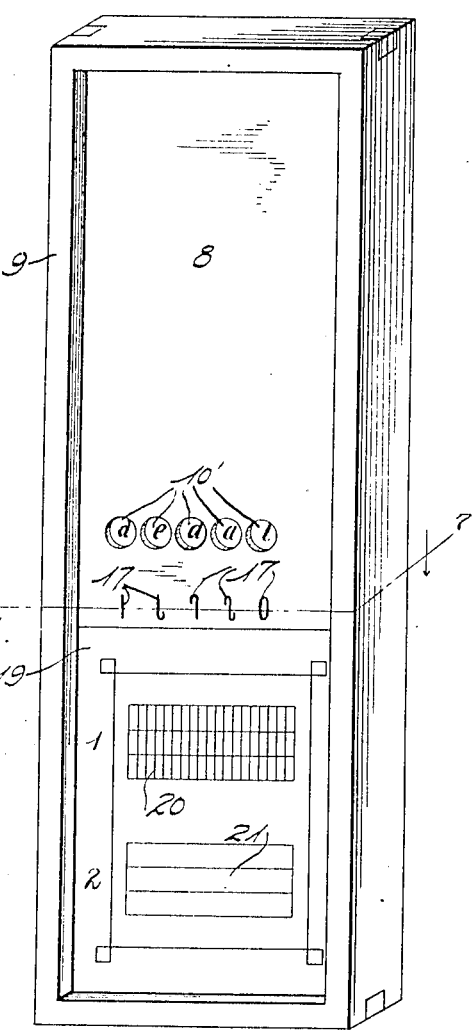
INVENTOR
Hermilio M. Vizcarra
BY
ATTORNEY H. M. VIZCARRA.
EDUCATIONAL APPARATUS.
APPLICATION FILED AUG. 8, 1917.
1,286,157.
Patented Nov. 26, 1918.
2 SHEETS—SHEET 2.
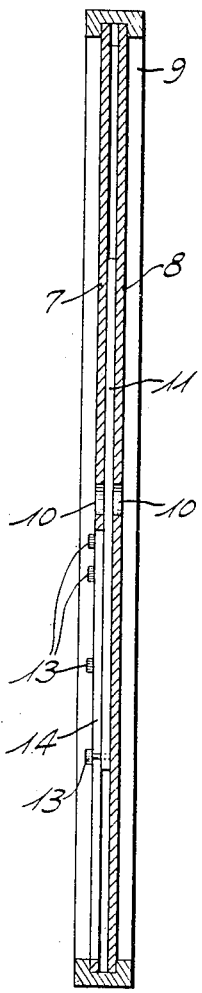
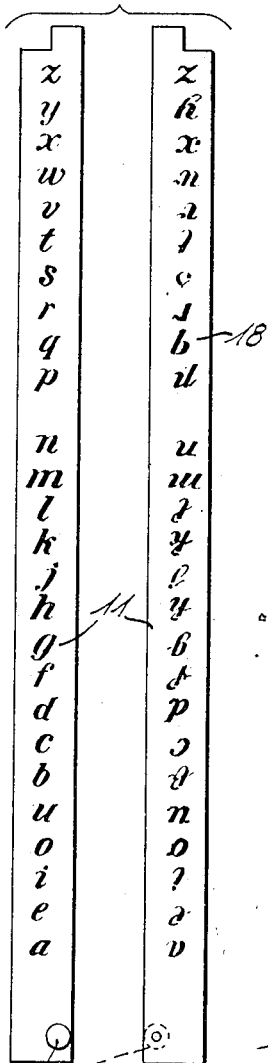
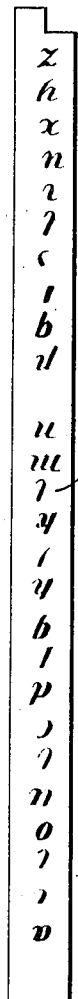
INVENTOR
Hermilio M. Vizcarra
BY
ATTORNEY

UNITED STATES PATENT OFFICE.

HERMILIO MANUEL VIZCARRA, OF LIMA, PERU.

EDUCATIONAL APPARATUS.

1,286,157.     Specification of Letters Patent.     Patented Nov. 26, 1918.

Application filed August 8, 1917. Serial No. 185,011.

*To all whom it may concern:*

Be it known that I, HERMILIO MANUEL VIZCARRA, a citizen of Peru, residing at Calle de San José 332, Lima, Peru, have invented new and useful Improvements in Educational Apparatus, of which the following is a specification.

This invention relates to an improvement in the teaching of reading and writing, by the intuitive and graphic method and the use of mechanical means.

The primary object of the invention is to depart from the use of books and other known methods of teaching children and the illiterate, which methods make instruction a wearying and a burdensome task, both for the teacher and the pupil. The object of the invention is to provide an objective and mechanical system of imparting and acquiring simultaneously a knowledge of word structures and manual dexterity in reproducing the words by writing, in a way which will immediately secure the child's or pupil's attention and interest, and contribute greatly to awaken and develop the powers of observation and retention, while exercising in a practical way the faculties of the mind which are natural to the child and the mentally immature, whereby the qualities of curiosity, activity, and motivity, which are strong in the child, may be taken advantage of. The object of the new system, in other words, is to make the task of learning how to read and write play rather than work and the apparatus used a toy in the hands of the pupil.

To these ends the invention consists in the construction and combination of parts set forth in the specification and claims and illustrated in the accompanying drawings, which disclose a handy and inexpensive apparatus composed of a small wooden box, flat and hollow, more or less the size and shape of an elongated writing plate with two faces, one prepared to give instruction in reading and the other in writing, the latter having hieroglyphic recesses for use in the first stages of the writing instruction. It will be understood that the construction of the drawings is merely illustrative of the invention, the scope of the invention being indicated in the appended claims. In the drawings:

Figure 1 is a top plan view of the apparatus, partially broken away to show the slides;

Fig. 2 is a lateral section taken on the line 2—2 of Fig. 1;

Fig. 3 is a perspective view showing the rear face of the apparatus;

Fig. 4 is a longitudinal section taken on the line 4—4 of Fig. 1;

Fig. 5 shows two enlarged details of the front and rear faces of one of the slides; and Fig. 6 is a view similar to the right hand detail of Fig. 5, but is diagrammatic in the sense that it shows only parts of the letters shown in Fig. 5, the parts shown in Fig. 6 being those parts which represent the strokes pursuant to one of the hieroglyphic recesses 17; the idea being that, if desired, the instructor or manufacturer of the apparatus may add the missing parts of the letters of Fig. 6 in a different colored ink, and Fig. 7 is a sectional view, on an enlarged scale, taken on line 7—7 of Fig. 3.

The apparatus, which I have called heretofore the "lecto-mecanografo Vizcarra", or "mechanical instructor", comprises a box or casing of parallelogram form, conveniently having the dimensions of forty centimeters in length, thirty centimeters in width, and of suitable thickness based on the other dimensions given below. The complete apparatus comprises the box or casing, the slides therein, the intuitive alphabet carried thereby, a slate, and accessories for use in connection with using the hieroglyphs and the slate and for erasing the inscriptions on the slate.

The box or casing is built up of two plane top and bottom or front and rear walls of wood, each about three millimeters thick, the top or front wall being indicated at 7 and the bottom or rear wall being indicated at 8. The walls are held spaced as illustrated by being set into a wooden locked-corner frame 9. Through the front wall 7 are cut five apertures or windows 10, these windows being arranged in a line transverse to the length of the casing at about its middle. The windows are really indices of particular letters carried by a plurality of independently movable slides 11 housed within the box. The slides are arranged side by side as illustrated, are guided by each other and by two fixed guides 12, and are adapted to be moved in the direction of their length and of the length of the box. Each of the slides has a path of movement which intersects one of the windows 10, and each slide is provided with the letters of the alphabet arranged in line thereon as shown, the parts being so designed that a slide may be adjusted to display any particular letter through the window alloted to that slide. The slides are of the same length, and each is provided at its lower end with a handle or button 13 offset therefrom and protruded through one of a plurality of spaced elongated slots 14 cut in the front wall 7. Each of the slots is elongated in the direction of the travel of its slide, and so disposed that the button of any slide may be moved along the adjacent slot to cause any one of the letters on that slide to appear in its own window 10. The slides may desirably be constructed of tin plate, nineteen and one-half centimeters long by thirteen millimeters wide.

The front sides of the slides are provided with the letters of the alphabet arranged as described and in correspondence with the arrangement of letters of the same alphabet on the front wall 7 to the left of the slots 14, as indicated at 15. It will be noted that the letters on the fixed member or wall 7 are arranged in two columns, or lines, in staggered relation, with the vowels at the top in regular order, followed by the consonants in the same order. This staggered relation is of some importance in the construction now being described, inasmuch as relatively close lines 16 may be ruled across the slots 14, each line being prolonged to the right of one of the letters on the wall 7. At the same time, a comparatively large space is provided adjacent to each of these letters within which may be drawn the object graphically related to that letter, according to the theory of the invention. It will be noted from Fig. 1 that the space between the letter "m" and "q", in the left hand column of the two columns of letters on member 7, is blank; this space having been provided for the letter "ñ" peculiar to the Spanish language, for instruction in which the apparatus was first constructed. In this connection, it is explained that pasters or labels or the like may be provided for the part 15 of the front wall 7 and for the slides 11, to adapt the apparatus and system for the instruction of any language, and to make any mechanically complete apparatus readily adaptable to a selected language. Of course, as illustrated in the case of the English alphabet in Fig. 1, the objects delineated in significant relation to the letters of the alphabet to be taught, are objects the names of which in the language being taught commence with the letters shown. This alphabet illustrated in Fig. 1 is the intuitive alphabet of the present invention. In the construction illustrated, the intuitive alphabet consists of a single oleograph, seventeen centimeters and seven millimeters in length, by three centimeters and one millimeter in width. The pictures should be simple, unmistakable, highly colored and easy to remember; and desirably the backgrounds for the vowels are tinted a different color from the backgrounds of the consonants.

The rear wall 8, directly opposite the windows 10 in the front wall 7, is provided with similar and similarly arranged number of windows 10', through which will be displayed letters carried on the rear faces of the slides exactly corresponding to the letters carried on the fronts of the slides, with the exception that the letters on the rears of the slides are in script. By this arrangement, when the buttons 13 are adjusted relative to the intuitive alphabet to spell a word in italics through the windows 10, and having the same letters therein as the letters shown in roman type in the intuitive alphabet, the same word is shown in script letters at the windows 10', in close adjacency to a series of hieroglyphs 17 arranged in line just below and parallel to the line of windows 10'. The hieroglyphs are all different, and each represents a fundamental characteristic main stroke of the pen or pencil in writing script letters. In Fig. 5, an alphabet which may be carried by the rear face of a slide 11 is shown at 18. In Fig. 6, a similar alphabet is shown, as the same would be constituted provided all strokes not corresponding to some one or several of the hieroglyphs 17 were omitted. An advantageous arrangement would be to provide the rear faces of the slides with script alphabets as indicated at 18 in Fig. 5, except that the parts of these letters of this alphabet common to both Figs. 5 and 6 would be printed, say, in black, while the extra curlicues or the like would be printed in red, whereby the child can first practise the main part of the stroke by means of playing his pencil in the appropriate hieroglyphic recess or groove, then transfer this stroke to a writing surface, and then add the extra curlicues.

This writing surface to which the student transfers the strokes practised on the hieroglyphs, is a slate or the like carried at the rear of the box or casing. The slate may comprise a part of the rear wall 8, as indicated at 19. Slate 19 is provided with two sets of rulings 20 and 21, numbered on the slate, respectively, "1" and "2". The rulings 20 are spaced and dimensioned to correspond with the maximum dimensions of the vertical and curved parts of the hieroglyphs 17, while the rulings 21 are spaced and dimensioned to correspond only to the height of the hieroglyphs. The rulings 20 and 21 are preferably permanent, so that an exercise may be erased from the slate without obliterating the rulings. The writing accessories, above referred to, that is, a little pencil, a holder therefor, and a sponge or eraser, are provided; and the pencil has been placed in a channel or recess made at the left or lower part of the frame; the pencil holder in a similar arrangement at the extreme opposite side; and the sponge, attached to a small piece of wood, in an opening or channel in the center of the same lower frame.

The operation of the instruction should be clear from the foregoing. The principal rules for teaching by means of this apparatus are very simple, and may be reduced to the following: (1) To cause the child to clearly distinguish the pictures by pointing out to him the features thereof in simple and familiar language in order to interest him in the idea. (2) To accustom him to the use of the mechanical buttons. (3) To instruct him in the use of letters by means of common words, and in the formation of words from these letters. (4) To form by the use of the grooves or hieroglyphs, and by exercises on the rulings, the elementary movements used in writing. (5) To stimulate him with fables or talks concerning the lessons. It has been found that the lessons should not last more than twenty minutes each. It is preferable that the children converse with the teacher over and regarding each figure, because the richness of the child's imagination always brings out something new.

When it comes time to use the indicating buttons, the instructor selects a word, say the word "mouse," and asks the child where is the mouse found in the illustrations. The teacher then explains that the letter printed is the letter "M," the initial letter of the mouse's word, printed like it is used in newspapers and books. The child is then told to run his finger out along the line 16 prolonged from the illustration of the mouse until his finger lies across the first slot 14 and then to move the first button 13 down until it strikes his finger; when the letter "m" will jump into place in the first window. The teacher will then tell the child that the "m" in the window is the same as the "m" near the picture of the mouse, but that the "m" in the window is what is called italic, and is used likewise in printing books and newspapers. In similar manner the word selected is spelled out in full; and, as desired, the writing exercise may be at the conclusion of the registration of each selected letter with one of the windows 10 and 10', or at the conclusion of the entire word in these windows. In the case of words of more letters than five,—which is the number of windows 10 and 10' provided—it has been found that no syllable exceeds five letters; and so the word is split up into syllables, the teacher covering parts of the word so as only to expose the particular syllable then forming the subject of the exercise, and the same procedure may be followed in relation to sentences.

On turning the apparatus over, the child finds that letters are shown in the openings 10' corresponding to the letters shown in the openings 10, but with the former letters in script. The nature of these script letters being understood or explained, the writing exercise may commence, during which the five engravings of the fundamental hieroglyphs of script are used, the child rapidly passing his pencil over the grooves to accustom his hand to trace the characteristic directions in the design of script letters. When the child has thus acquired a certain freedom of touch and sight, the activities of his pencil are transferred to the upper set of rulings, where the pencil is not positively guided by hieroglyphs, but materially aided by the horizontal lines as to the height of the script strokes and by the vertical lines as to the width of the script strokes. Finally, the child is taught to practise the script strokes by the use of the lower set of rulings, being aided merely as to the height of the strokes, by the horizontal lines.

It has been found that the teaching of the capital letters in script may be deferred, and then taught by the ordinary copy-book method, the teacher first inscribing the letter to be copied on a suitable surface, say the rear wall 8 above the line of windows 10'. It should be explained that it has been found that when a child is less than five years old, he confuses the letters "l" and "j" and has difficulty in remembering their differences.

It has been actually found, by many experiments, that the children of primary age, instructed according to the present system and using the mechanical instructor, have learned to read and write in twelve lessons, words composed of five letters each, making a total of fifty-five letters, comprising all in the Spanish alphabet, the writing keeping pace with the reading by the aid of the slate and the hieroglyphs; children have been taught in thirty days to read and write almost correctly and without tiring or forcing. The invention is obviously applicable to any language or dialect which may be written; in most cases merely the alphabet carried by the slides and the front wall 7 have to be changed, and in a good many cases only the alphabet carried by the wall 7 and then solely to provide illustrations which a child learning that language can understand.

I claim:

1. An educational apparatus comprising a fixed support carrying an alphabet of a certain style, a plurality of slides each carrying a first alphabet of a different style and a second alphabet of a further different style, indices on the slides whereby the slides may be positioned with their indices opposite various selected letters of the first mentioned alphabet, a fixed member having a plurality of openings arranged in line transverse to the slides, said openings being adapted to expose one letter at a time of each of the alphabets of the same style on the slides, and a second plurality of openings arranged in line transverse to the slides adapted to expose one letter at a time of each of the alphabets of the other style on the slides, the parts being so designed and the alphabets being so arranged on the fixed support and on the slides that the group of letters selected by the indices on the slides is duplicated at the said first.line of openings and said second line of openings.

2. An educational apparatus comprising a flat casing having front and rear walls, a plurality of slides arranged side by side within the casing for independent travel lengthwise of the casing, elongated slots in the front wall of the casing overlying the path of movement of each slide, buttons on the slides protruding through the slots, a plurality of windows in the front wall arranged in a line transverse to the casing with one window located over the path of travel of each slide, a similar line of windows in the rear wall, and alphabets, arranged in column lengthwisely of the casing, on the front wall alongside the slots, and on the front and rear walls of each slide, whereby when the buttons are moved opposite various letters of the alphabet on the front wall of the casing to spell a word according to letters selected by successive slots from one side of the casing to the other, the same word is spelled correctly and conventionally through each line of windows.

3. An educational apparatus comprising a flat casing having front and rear walls, a plurality of slides arranged side by side within the casing for independent travel lengthwise of the casing, elongated slots in the front wall of the casing overlying the path of movement of each slide, buttons on the slides protruding through the slots, a plurality of windows in the front wall arranged in a line transverse to the casing with one window located over the path of travel of each slide, a similar line of windows in the rear wall, and alphabets, arranged in column lengthwisely of the casing, on the front wall alongside the slots, and on the front and rear walls of each slide, whereby when the buttons are moved opposite various letters of the alphabet on the front wall of the casing to spell a word according to letters selected by successive slots from one side of the casing to the other, the same word is spelled correctly and conventionally through each line of windows, the alphabet on the front wall being an intuitive alphabet in that significantly adjacent each letter is a representation of a familiar every-day object which has that letter as its initial.

In testimony whereof I have signed my name to this specification.

HERMILIO MANUEL VIZCARRA.

Copies of this patent may be obtained for five cents each, by addressing the "Commissioner of Patents, Washington, D. C."